(12) United States Patent
Addiego et al.

(10) Patent No.: US 8,101,117 B2
(45) Date of Patent: Jan. 24, 2012

(54) CONTROLLED GAS PORE FORMERS IN EXTRUDED WARE

(75) Inventors: William Peter Addiego, Big Flats, NY (US); Christopher Raymond Glose, Painted Post, NY (US)

(73) Assignee: Corning, Incorporated, Corning, NY (US)

( * ) Notice: Subject to any disclaimer, the term of this patent is extended or adjusted under 35 U.S.C. 154(b) by 565 days.

(21) Appl. No.: 12/129,959

(22) Filed: May 30, 2008

(65) Prior Publication Data

US 2009/0298667 A1 Dec. 3, 2009

(51) Int. Cl.
 *B28B 3/20* (2006.01)
(52) U.S. Cl. ........................................ 264/630; 264/631
(58) Field of Classification Search .................. 264/630, 264/631
 See application file for complete search history.

(56) References Cited

U.S. PATENT DOCUMENTS

| | | | |
|---|---|---|---|
| 2,104,609 A * | 1/1938 | De Leeuw | ...................... 51/296 |
| 3,885,977 A | 5/1975 | Lachman et al. | |
| 4,483,944 A | 11/1984 | Day et al. | |
| 4,855,265 A | 8/1989 | Day et al. | |
| 5,183,608 A | 2/1993 | Guile | |
| 5,258,150 A | 11/1993 | Merkel et al. | |
| 5,290,739 A | 3/1994 | Hickman | |
| 6,210,626 B1 | 4/2001 | Cornelius et al. | |
| 6,318,870 B1 | 11/2001 | Beall et al. | |
| 6,368,992 B1 | 4/2002 | Beall et al. | |
| 6,432,856 B1 | 8/2002 | Beall et al. | |
| 6,620,751 B1 | 9/2003 | Ogunwumi | |
| 6,773,657 B2 | 8/2004 | Beall et al. | |
| 6,849,181 B2 | 2/2005 | Ogunwumi et al. | |
| 6,864,198 B2 | 3/2005 | Merkel | |
| 6,942,713 B2 | 9/2005 | Ogunwumi et al. | |
| RE38,888 E | 11/2005 | Beall et al. | |
| 2004/0020846 A1 | 2/2004 | Ogunwumi et al. | |
| 2004/0029707 A1 | 2/2004 | Beall et al. | |
| 2004/0092381 A1 | 5/2004 | Beall et al. | |
| 2004/0261384 A1 | 12/2004 | Merkel et al. | |

FOREIGN PATENT DOCUMENTS

| | | |
|---|---|---|
| WO | 2004011386 A1 | 2/2004 |
| WO | 2005046840 A1 | 5/2005 |
| WO | 2006015240 A2 | 2/2006 |

* cited by examiner

*Primary Examiner* — Matthew Daniels
*Assistant Examiner* — Russell Kemmerle, III
(74) *Attorney, Agent, or Firm* — Walter M. Douglas

(57) ABSTRACT

The present invention provides compositions and methods for producing porous ceramic articles. The compositions and methods comprise a ceramic precursor batch comprising an organic peroxide pore forming agent where the pore forming agent is an organo-adduct of hydrogen peroxide and an organic compound or an organic peroxide of the general formula R—O—O—R'. The organic peroxide pore forming agent is stable during extrusion and other methods for forming a green body and does not decompose until the green body is dried.

14 Claims, No Drawings

CONTROLLED GAS PORE FORMERS IN EXTRUDED WARE

BACKGROUND

The present invention relates generally to porous ceramic articles and methods for producing the same, and particularly to methods of producing porous ceramic articles using an organic hydrogen peroxide as the pore forming agent.

Porosity in ceramic substrates has been generated for decades by the use of organic pore formers. Typical organic pore formers such as graphite, starch, rice and cork have a large exotherm from 400-900° C. This exotherm results in cracking issues during calcination and very slow ramp rates. Organic pore formers typically produce a ceramic substrate with between 50% and 60% porosity. As the market pushes forward the demand for low cost and high porosity ceramic substrates continues. To achieve high porosity from conventional organic pore formers, a large amount of material must be added. Sometimes greater than 50% organic pore former was needed to achieve 65% porosity. In addition, for high porosity demands, this larger organic pore former loading does not produce equivalent resulting porosity.

Recently, hydrogen peroxide has been used to generate porosity in alumina titanate bodies. While overcoming the disadvantages of the conventional "burn out" pore formers, hydrogen peroxide was not optimal. Ceramic oxides catalyzed hydrogen peroxide on contact, resulting in changing porosity through extrusion and drying. Ultimately, the last piece extruded and dried had a much larger porosity than the first piece extruded.

Therefore it would be desirable to have a pore forming agent that provided ceramic substrates having more consistent and greater porosity, that could be controlled to give a desired pore size and would not require a "burn out" period. It would also be advantageous if such a pore former were not catalyzed upon contact with ceramic oxides, but was stable through an extrusion or molding step.

SUMMARY

In one aspect of the present invention there is provided a method for producing a porous ceramic article, comprising the steps of providing inorganic ceramic-forming ingredients; adding an organic binder, a solvent and a pore forming agent to the inorganic ceramic-forming ingredients, wherein the pore forming agent is an organo-adduct of hydrogen peroxide and an organic compound or an organic peroxide of the general formula R—O—O—R', mixing the inorganic ceramic-forming ingredients, the organic binder, the solvent and the pore forming agent to form a precursor batch, forming the precursor batch into a green body and firing the green body to produce a porous ceramic article. The pore forming agent is stable during the step of forming the green body and decomposes after the forming of the green body but before firing the green body; typically during the drying step used in making extruded ceramic body.

In another aspect of the present invention there is provided a method for manufacturing a porous ceramic honeycomb body comprising the steps of providing inorganic ceramic-forming ingredients, adding an organic binder, a solvent and urea hydrogen peroxide to the inorganic ceramic-forming ingredients, wherein the urea hydrogen peroxide is from about 0.5 wt % to about 10 wt % wherein the weight % is based on 100% of the inorganic ceramic-forming ingredients, mixing the inorganic ceramic forming ingredients, the organic binder, the solvent and the pore forming agent to form a precursor batch, extruding the precursor batch to form a honeycomb green body, then at least substantially drying the honeycomb green body at a temperature below approximately 400° C. prior to firing the green body and firing the green body to produce a porous ceramic article.

In a further aspect of the present invention there is provided a ceramic precursor batch composition comprising inorganic ceramic-forming ingredients and a pore forming agent wherein the pore forming agent is urea hydrogen peroxide.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Broadly, the present invention provides an improved method for manufacturing porous ceramic articles that, for example, can be useful in ceramic filter applications. The method for producing a porous ceramic article may comprise the steps of providing inorganic ceramic-forming ingredients and adding an organic binder, a solvent and a pore forming agent to the ceramic-forming ingredients. The pore forming agent may be (1) an organo-adduct of hydrogen peroxide and an organic compound and/or (2) an organic peroxide of the general formula R—O—O—R'; and (1) and/or (2) may be called herein "organic hydrogen peroxides", "organic peroxides", "organic peroxide", "peroxide compounds" and similar terms. The method may also comprise mixing the inorganic ceramic-forming ingredients, the organic binder, the solvent and the pore forming agent to form a precursor batch. The precursor batch may then be formed into a green body, dried and fired to produce a porous ceramic article. In contrast to hydrogen peroxide alone, the pore forming agents of the present invention may be stable during the step of forming the green body and decompose after the forming of the green body but before firing of the green body.

Another advantage of using pore forming agents comprising organic hydrogen peroxides is that the organic peroxide containing compound may decompose to yield pore-generating gas (i.e., oxygen, carbon dioxide, nitrogen, etc.) at relatively low temperatures that are generally less than 400° C. but greater than 50° C. Moreover, the organic peroxide containing compound may be stable during formation of a green body, decomposing during the drying step and before firing of the body. Thus the use of organic peroxide pore forming agents can offer several processing advantages over the conventional pore forming agents that typically require a dedicated hold time at relatively high temperatures during the firing cycle in order to burn out the pore former by, for example, combustion. In use, the pore forming peroxide compounds of the present invention decomposes to yield pore-generating gas (i.e., oxygen, carbon dioxide, nitrogen, etc.) at relatively low temperatures that are generally less than 400° C. The resulting pore microstructure that is formed by the evolving decomposition gases is further retained in the ceramic article after firing at temperatures greater than 1200° C. Further, because the pore forming peroxide compounds decompose at low temperatures, a desired pore microstructure can be formed while drying a formed green body rather than during a burn out cycle at temperatures greater than 1200° C. Thus, it will be appreciated that the peroxide pore former can enable the use of a shorter firing schedule during processing which can, for example, provide an increased article strength by reducing article cracking that can result from high exotherms during conventional firing schedules.

In one embodiment of the present invention, the pore forming agent of the present invention may be an organic peroxide. The term organic peroxide is contemplated to include organo-adducts of hydrogen peroxide and an organic compound as well as organic peroxides of the general formula R—O—O—R'. An organo-adduct of hydrogen peroxide may be a compound where the organic compound forms a complex with hydrogen peroxide, usually through hydrogen bonding. Non-limiting examples of an organo-adduct of hydrogen peroxide may be urea hydrogen peroxide, histidine hydrogen peroxide, adenine hydrogen peroxide or combinations thereof. Additionally, the organo-adducts of hydrogen peroxide may be homogeneous or heterogeneous.

The pore forming agent may be an organic peroxide having the general formula R—O—O—R' where R and R' may each independently be alkyl, substituted alkyl, phenyl, napthyl, substituted phenyl, substituted napthyl or combinations thereof R or R' may also be hydrogen, however, when R or R' is hydrogen then R≠R'. Non-limiting examples of organic peroxides are t-butylperoxytrimethylsilane, di(t-butylperoxy)dimethylsilane, di(t-butylperoxy)diphenylsilane or combinations thereof.

The pore forming agent may be stable during mixing and formation of the green body but decomposes before firing of the green body. If the pore forming agent begins to decompose during formation of the green body, the porosity of the resulting ceramic articles will be inconsistent between the first article formed from a batch and articles formed latter from the same batch. It may also make it more difficult to obtain batch to batch uniformity of the porosity. In an exemplary embodiment, the pore forming agent may be stable up to 50° C. with no significant decomposition occurring below 50° C. One simple way to determine if the pore forming agent is decomposing during formation of the green body is a green body water test. The green body is submerged in water and if bubbles appear, the pore forming agent has begun to decompose. If there are no bubbles or almost no bubbles, the pore forming agent is stable. For example, when a green body having hydrogen peroxide as the pore forming agent is submerged in water, bubbles are observed. In contrast, when a green body having urea hydrogen peroxide as the pore forming agent is submerged in water, no bubbles are observed.

In another embodiment, the method of the present invention may further comprise the step of drying the green body before firing. In one exemplary embodiment, the green body may be dried at a temperature less than 400° C., or from about 100° C. to about 350° C. The drying of the green body may increase the decomposition rate of the pore forming agent with the evolving oxygen gas forming pores. The rate of decomposition may be controlled by controlling the temperature of the drying step. However, the decomposition may not be so rapid that the pore forming agent is explosive during either the drying or firing steps. Examples of pore forming agents that may be explosive are organic hydroperoxides.

In a further embodiment, the pore forming agent may be present in any amount effective to provide a desired porosity in the ceramic article. In one exemplary embodiment, the pore forming agent may from about 0.5 wt % to about 10 wt %. In an alternative exemplary embodiment, the pore forming agent may be present at from about 3 wt % to about 10 wt %. As used herein, a "wt. %" or "weight percent" or "percent by weight" of an organic component, unless specifically stated to the contrary, is based on the total weight of the total inorganics in which the component is included. Organics are specified herein as superadditions based upon 100% of the inorganics used.

In yet another embodiment, conventional pore formers may also be added to the inorganic ceramic-forming ingredients in addition to the pore forming agents. Conventional pore formers can typically be any particulate substance that "burns out" of the formed green body during the firing step. This may include any fugitive particulate material which evaporates or undergoes vaporization by combustion during drying or heating of the green body to further obtain a desired, usually larger porosity and/or coarser median pore diameter than would otherwise be obtained. Exemplary and non-limiting optional burnout agents that can be used include organics that are solid at room temperature, elemental carbon, graphite, cellulose, sugars, flour, starches, and the like. Conventional pore formers may be present in the precursor batch composition at up to about 80 wt %.

In one embodiment, the inorganic batch components can be any combination of inorganic components which, upon firing, can provide a primary sintered phase composition. The inorganic ceramic-forming ingredients may be cordierite, mullite, clay, talc, zircon, zirconia, spinel, aluminas and their precursors, silicas and their precursors, silicates, aluminates, lithium aluminosilicates, feldspar, titania, fused silica, nitrides, carbides, borides, e.g., silicon carbide, silicon nitride, soda lime, aluminosilicate, borosilicate, soda barium borosilicate or combinations of these, as well as others. Combinations of these materials may be physical or chemical combinations, for example, mixtures or composites, respectively.

In one exemplary embodiment, the inorganic ceramic-forming ingredients may yield an aluminum-titanate ceramic material upon firing. In another exemplary embodiment, the inorganic ceramic-forming ingredients may be those that yield cordierite, mullite, or mixtures of these on firing, some examples of such mixtures being about 2% to about 60% mullite, and about 30% to about 97% cordierite, with allowance for other phases, typically up to about 10% by weight. Some ceramic batch material compositions for forming cordierite that are especially suited to the practice of the present invention are those disclosed in U.S. Pat. Nos. 3,885,977; RE 38,888; 6,368,992; 6,319,870; 6,24,437; 6,210,626; 5,183,608; 5,258,150; 6,432,856; 6,773,657; 6,864,198; and U.S. Patent Application Publication Nos. 2004/0029707; 2004/0261384, which are herein incorporated by reference as filed. Some ceramic batch material compositions for forming aluminum titanate that are especially suited to the practice of the present invention are those disclosed in U.S. Pat. Nos. 4,483,944; 4,855,265; 5,290,739; 6,620,751; 6,942,713; 6,849,181; U.S. Patent Application Publication Nos.: 2004/0020846; 2004/0092381; and in PCT Application Publication Nos. WO 2006/015240; WO 2005/046840; and WO 2004/011386, which are herein incorporated by reference.

The inorganic ceramic-forming ingredients, the organic binder and the pore forming agent may be mixed together with a solvent to form a precursor batch. The solvent may provide a medium for the binder to dissolve in, thus providing plasticity to the batch and wetting of the powders. The solvent may be aqueous based, which may normally be water or water-miscible solvents, or organically based. Most useful are aqueous based solvents which provide hydration of the binder and powder particles. Typically, the amount of aqueous solvent is from about 20% by weight to about 50% by weight.

The organic binder may be any binder known in the art for producing ceramic articles. In an exemplary embodiment, the binder may be a cellulose ether binder such as, but not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxymethylcellulose, and mixtures thereof.

The properties of preferred cellulose-based binders such as methylcellulose may be water retention, water solubility, surface activity or wetting ability, thickening of the mixture, providing wet and dry green strength to the green bodies, thermal gelation and hydrophobic association in an aqueous environment. Cellulose ether binders that promote hydrogen bonding interaction with the solvent may be desirable. Non-limiting examples of substituent groups that maximize the hydrogen bonding interaction with polar solvents e.g. water, may be hydroxypropyl and hydroxyethyl groups, and to a smaller extent hydroxybutyl groups.

In another embodiment of the invention, other additives such as surfactants and oil lubricants may be added to the inorganic ceramic-forming ingredients as long as they do not cause decomposition of the pore forming agent while forming the green body. Non-limiting examples of surfactants that may be used in the practice of the present invention are $C_8$ to $C_{22}$ fatty acids and/or their derivatives. Additional surfactant components that may be used with these fatty acids are $C_8$ to $C_{22}$ fatty esters, $C_8$ to $C_{22}$ fatty alcohols, and combinations of these. Exemplary surfactants are stearic, lauric, oleic, linoleic, palmitoleic acids, and their derivatives, stearic acid in combination with ammonium lauryl sulfate, and combinations of all of these. In an illustrative embodiment, the surfactant may be lauric acid, stearic acid, oleic acid, and combinations of these. The amount of surfactants typically may be from about 0.5% by weight to about 2% by weight.

Non-limiting examples of oil lubricants may be light mineral oil, corn oil, high molecular weight polybutenes, polyol esters, a blend of light mineral oil and wax emulsion, a blend of paraffin wax in corn oil, and combinations of these. Typically, the amount of oil lubricants may be from about 1% by weight to about 10% by weight. In an exemplary embodiment, the oil lubricants may be present from about 3% by weight to about 6% by weight.

In one embodiment of the invention, the precursor batch may be formed into a green body by any known conventional ceramic forming process, such as, e.g., extrusion, injection molding, slip casting, centrifugal casting, pressure casting, dry pressing, and the like prior to any substantial decomposition of the pore forming agent and subsequent pore forming gas evolution. In an exemplary embodiment, extrusion may be done using a hydraulic ram extrusion press, or a two stage de-airing single auger extruder, or a twin screw mixer with a die assembly attached to the discharge end. In the latter, the proper screw elements may be chosen according to material and other process conditions in order to build up sufficient pressure to force the batch material through the die.

The green bodies of this invention may have any convenient size and shape and the invention is applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities may range from about 235 cells/cm$^2$ (1500 cells/in$^2$) to about 15 cells/cm$^2$ (100 cells/in$^2$). Examples of honeycombs produced by the process of the present invention, although it is to be understood that the invention is not limited to such, may be those having about 94 cells/cm$^2$ (about 600 cells/in$^2$), or about 62 cells/cm$^2$ (about 400 cells/in$^2$) each having wall thicknesses of about 0.1 mm (4 mils). Typical wall thicknesses may be from about 0.07 to about 0.6 mm (about 3 to about 25 mils), although thicknesses of about 0.02-0.048 mm (1-2 mils) may be possible with better equipment. The method may be especially suited for extruding thin wall/high cell density honeycombs. It will be appreciated that although a honeycomb ceramic filter of the present invention normally may have a structure in which a plurality of through holes opened to the end surface of the exhaust gas flow-in side and to the end surface of the exhaust gas flow-out side are alternately sealed at both the end surfaces, the shape of the honeycomb filter is not particularly restricted. For example, the filter may be a cylinder having end surfaces with a shape of a circle or an ellipse, a prism having the end surfaces with a shape of a polygon such as a triangle or a square, a shape in which the sides of these cylinder and prism are bent like a "doglegged shape," or the like. In addition, the shape of through holes is not particularly limited. For example, the sectional shape may be a polygon, such as a square, a hexagon, an octagon, a circle, an ellipse, a triangle, or other shapes or combinations. It should however be understood that the particular desired size and shape of the ceramic article can depend on the application, e.g., in automotive applications by engine size and space available for mounting, etc.

The formed green body having a desired size and shape as described above may then be dried to remove excess moisture. Additionally, as described above, the drying step may also initiate the decomposition of the organic peroxide composition resulting in the evolution of pore forming gases. The drying step may be carried out by any known method, including for example, microwave, hot air, autoclave, convection, humidity controlled, freeze drying, critical drying, and any other method that can affect the extent and rate of peroxide decomposition within the formed green body. In one exemplary embodiment, the green body may be dried at a temperature less than 400° C., or from about 100° C. to about 350° C.

In still another embodiment, the microstructure of the resulting ceramic article may be controlled and/or optimized to provide a desired microstructure by selecting optimized drying conditions. For example, exemplary drying conditions may include rapid heating with microwave or dielectrically generated heat in the material that may provide homogeneous pore formation as a result of organic peroxide decomposition. The amount of power used may range from several hundred to tens of kilowatts and the duration of drying can be dependent on the size of the ceramic article and composition. In one aspect, the temperature can be raised above 50° C. rapidly to decompose the organic peroxide and intermediates, evolving gases and creating pores as the gas, generally oxygen, escapes the ceramic article.

Once dried, the green body may be fired under conditions effective to convert the green body into a ceramic article comprising a primary crystalline phase ceramic composition as described below.

The firing conditions effective to convert the green body into a ceramic article may vary depending on the process conditions such as, for example, the specific composition, size and/or shape of the green body, and nature of the equipment used. To that end, in one embodiment, the optimal firing conditions specified herein may need to be adapted for very large cordierite structures, i.e., slowed down, for example. However, in one exemplary embodiment, for mixtures that are primarily for forming cordierite, the firing conditions may comprise heating the green body to a maximum soak temperature of between about 1350° C. to about 1450° C. In still another exemplary embodiment, the green body may be fired at a soak temperature in the range of from about 1400° C. to about 1450° C. In still yet another embodiment, the green body may be fired at a soak temperature in the range of from about 1415° C. to about 1435° C., including a preferred soak temperature of, for example, of between about 1420° C. and about 1430° C.

The firing times may also range from approximately 40 to 250 hours, during which a maximum soak temperature can be reached and held for a soak time in the range of from about 5 hours to about 50 hours, more preferably between about 10 hours to about 40 hours. In still another aspect, the soak time may be in the range of from about 15 hours to about 30 hours. A preferred firing schedule includes firing at a soak temperature of between about 1415° C. and 1435° C. for between about 10 hours to about 35 hours.

As briefly stated above, and as further exemplified in the appended example, the use of the organic peroxide containing compounds, such as urea hydrogen peroxide, as a pore former in the plasticized ceramic precursor batch composition of the present invention may further enable the use of processing conditions that provide a resulting ceramic article having a unique combination of microstructure characteristics and performance properties. For example, in one embodiment, the use of urea hydrogen peroxide may enable a reduction in the required overall firing cycle time by minimizing or eliminating the firing cycle hold periods typically used for conventional pore-former burnout. For example, an exemplary firing cycle may comprise increasing the firing temperature from ambient or 25° C. at a rate of approximately 2° C./min to a soak temperature in the range of from 1425° C. to 1440° C. and holding the soak temperature for approximately 15 hours, followed by cooling to 25-28° C. at a rate of approximately 2° C./min.

It should be appreciated that the organic peroxide pore forming agents may be used to manufacture ceramic articles having any desired microstructure and further exhibiting any desired performance property or combination of performance properties. For example, a ceramic article may be produced possessing a microstructure characterized by a unique combination of relatively high porosity (but not too high) that can provide improved flow through properties within the material and still exhibit a high strength and chemical durability. The resulting ceramic structure may therefore be useful for ceramic filter applications requiring high thermal durability and high filtration efficiency coupled with low pressure drop across the filter. Such ceramic articles are particularly well suited for filtration applications, such as diesel exhaust filters.

In another embodiment, the method of the present invention may further provide ceramic articles having any desired porosity. For example, the total porosity (% P) of the inventive ceramic bodies, as measured by mercury porosimetry, may in one aspect be greater than 40%. In another embodiment, the total porosity of the ceramic article may be from greater than 40% to less than 70%.

In still a further embodiment, the inventive method may be used to provide porous ceramic articles having any desired pore size distribution. To that end, the porosity microstructure parameters $d_{10}$, $d_{50}$ and $d_{90}$ may relate to the pore size distribution and are used herein, among other parameters, to characterize a pore size distribution. The quantity $d_{50}$ is the median pore diameter based upon pore volume, and is measured in μm; thus, $d_{50}$ is the pore diameter at which 50% of the open porosity of the ceramic honeycomb article has been intruded by mercury. The quantity $d_{90}$ is the pore diameter at which 90% of the pore volume is comprised of pores whose diameters are smaller than the value of $d_{90}$; thus, $d_{90}$ is equal to the pore diameter at which 10% by volume of the open porosity of the ceramic has been intruded by mercury. The quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also in units of microns.

In one aspect, the median pore diameter, $d_{50}$, of the pores present in the instant ceramic articles can, in one aspect, be at least 25 μm. In another aspect, the median pore diameter, $d_{50}$, is at least 30 μm. In another aspect, the median pore diameter, $d_{50}$, can be in the range of from 25 μm to 50 μm; or even 30 μm to 45 μm. These ranges provide suitable filtration efficiencies.

In another aspect, the ceramic articles of the present invention may exhibit a relatively high strength, as indicated by their modulus of rupture (MOR). For purposes of the present invention, modulus of rupture can be tested and evaluated based upon an inventive ceramic article of the present invention having 200 cells per inch-squared and webs 0.016-inch thick. However, it should be understood that any cell density and web thickness can be used. Thus, in one aspect, the ceramic articles of the present invention can have a modulus of rupture of at least 300 psi. In a further aspect, the modulus of rupture can be at least 1000 psi, at least 2000 psi, at least 3000 psi, at least 4000 psi, or even at least 5000 psi.

In still a further embodiment, the use of an organic peroxide pore forming agent in the manufacture of refractory ceramic articles may result in a relatively high permeability in combination with the relatively high strengths described above. As will be appreciated, a relatively high flow through or permeability coupled with high strength and chemical durability may provide several commercial advantages, such as reduced pressure drop across the ceramic body, increased filtration efficiency, added flexibility in article geometry, an increased product durability. In one aspect, the present invention provides a ceramic article comprising a permeability, as measured by mercury porosimetry, of at least 150 mDarcy. In still another aspect, the permeability can be at least 300 mDarcy, at least 400 mDarcy, or even at least 500 mDarcy. In still another aspect, the permeability can be in the range of from 500 mDarcy to 4000 mDarcy.

EXAMPLES

The invention will be further clarified by the following examples.

Example 1

An experimental study was done using a typical ram extrusion procedure. Compositions comprised urea hydrogen peroxide (UHP) in an advanced cordierite to produce porosity during drying. The compositions of the samples tested in given in Table 1. Initially, potato starch (PS) was left in the composition and (UHP) was added to boost the porosity. Further examples showed that potato starch could be removed and porosity still produced with UHP alone.

TABLE 1

Advanced Cordierite Compositions and Water Call

| Material | Control Weight % | 1 Weight % | 2 Weight % | 3 Weight % | 4 Weight % |
|---|---|---|---|---|---|
| Talc (FCOR coarse) | 40.73 | 40.73 | 40.73 | 40.73 | 40.73 |
| K-10 Clay | 15.95 | 15.95 | 15.95 | 15.95 | 15.95 |
| Silica | 12.26 | 12.26 | 12.26 | 12.26 | 12.26 |
| Alumina, Calcined | 14.98 | 14.98 | 14.98 | 14.98 | 14.98 |
| Alumina, Hydrated | 16.12 | 16.12 | 16.12 | 16.12 | 16.12 |
| Potato Starch | 10 | 10 | 10 | 0 | 0 |
| Methylcellulose | 4 | 4 | 4 | 4 | 4 |
| Water Call | 29 | 28 | 28 | 19.2 | 20 |
| Urea Hydrogen Peroxide | 0 | 3.3 | 3.3 | 3.3 | 7 |

Materials Characterization: Porosity data was obtained from mercury intrusion standard methods (MIP). SEM images were done on polished cross sections. Modulus of rupture (MOR) tests were conducted on a 4-point flex bar in an Instron machine. The MOR size was limited to 0.5"× 0.25"×2.5". CTE measurements were performed using a differential dilatometer with heat/cool rates of 4° C./min up to a temperature of 1000° C. Samples were bar shaped 0.25"× 0.25"×2" with the channels oriented down the 2" length of the piece.

Ram Extrusion: Initially a repeatability study was done to validate the theory that UHP could stabilize the porosity from the first part extruded to the last part extruded. Parts were all microwave dried at 650 W for 4 minutes. The results are shown in Table 2. Sample 1 repeats were 2"×1" Dia. Samples 2, 3 and 4 were 8"×1" Dia. As shown in Table 2, the standard deviations in the multiple trials were very low in all cases.

TABLE 2

Repeatability Study for Ram Extruder

| Sample ID | Addition | % Porosity | Median Pore Diameter (d50) (μm) | Permeability (mdarcy) |
|---|---|---|---|---|
| 1 | 10% PS + 3.3% UHP | 62.38 | 33.39 | 1780 |
| (std dev) | | 1.94 | 2.08 | 289 |
| 2 | 10% PS + 3.3% UHP | 60.39 | 32.85 | 1664 |
| (std dev) | | 0.59 | 0.4 | 98 |
| 3 | 7% UHP | 64.42 | 43.34 | 3792 |
| (std dev) | | 2.42 | 3.82 | 1012 |

TABLE 2-continued

Repeatability Study for Ram Extruder

| Sample ID | Addition | % Porosity | Median Pore Diameter (d50) (μm) | Permeability (mdarcy) |
|---|---|---|---|---|
| 4 | 3.3% UHP | 53.51 | 30.38 | 970 |
| (std dev) | | 1.73 | 0.67 | 88 |

Final properties of the ram extrusion parts that were calcined are summarized in Table 3. The super addition of 3.3% UHP (samples 1 and 2) produced an increased porosity by about 9% with a shift in median pore diameter from 28 μm to 33 μm. The d-factor also goes down suggesting a narrowing distribution. This resulting distribution causes the permeability to increase from 960 mdarcy for the control (10% potato starch) to 1780 mdarcy for sample 1. However, as a result of the increase in porosity the MOR decreases from 404 psi to 272 psi (control v. sample 1). These MOR results were done on only one data point however and should be interpreted with caution. Sample 4 shows that the removal of potato starch and the addition of 3.3% UHP could produce a product that comes very close to the control on all properties. Sample 3 showed that increasing the UHP to 7% without any potato starch present resulted in a slight increase in porosity compared to Sample 1 and a large increase in median pore diameter. The distribution of this sample produced an increase in permeability to 3792 mdarcy. A final extrusion was also done as a control with urea minus the hydrogen peroxide adduct but with potato starch (Sample 5, Table 3). The results for Sample 5 were very similar to the results for the control, suggesting that urea alone did not affect the final properties. Finally, the CTE values in all cases remained relatively unaffected.

TABLE 3

Summary of Final Properties for Ram Extruder

| Sample | PS (%) | UHP (%) | Porosity (%) | Total Vol. Intrusion (ml/g) | Median Pore Diameter (μm) | | | | Permeability (mdarcy) | CTE (800 C.) | MOR (psi) |
| | | | | | d50 | d10 | d90 | (d50 − d10)/d50 | | | |
|---|---|---|---|---|---|---|---|---|---|---|---|
| Control | 10 | 0 | 57 | 0.5 | 28 | 13 | 65 | 0.52 | 960 | 9.8 | 404 |
| 1 | 10 | 3.3 | 62 | 0.63 | 33 | 18 | 71 | 0.46 | 1780 | | 272 |
| 2 | 10 | 3.3 | 60 | 0.6 | 33 | 18 | 70 | 0.44 | 1664 | 10.8 | |
| 3 | 0 | 3.3 | 54 | 0.45 | 30 | 14 | 72 | 0.54 | 970 | 8.5 | 538 |
| 4 | 0 | 7 | 64 | 0.71 | 43 | 19 | 73 | 0.55 | 3792 | 8.4 | 324 |
| 5 | 10 | 2.2 (urea only) | 55 | 0.49 | 30 | 17 | 68 | 0.44 | 1096 | | 426 |

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for producing a porous ceramic article, comprising the steps of:
   providing inorganic ceramic-forming ingredients;
   adding an organic binder, a solvent and a pore forming agent to the inorganic ceramic-forming ingredients, wherein the pore forming agent is t-butlyperoxytrimethylsilane, di(t-butylperoxy)dimethylsilane, di(t-butylperoxy)diphenylsilane or combinations thereof;

mixing the inorganic ceramic forming ingredients, the organic binder, the solvent and the pore forming agent to form a precursor batch;

forming the precursor batch into a green body;

firing the green body to produce a porous ceramic article; and wherein the pore forming agent is stable during the step of forming the green body and decomposes after the forming of the green body but before firing the green body.

2. The method of claim 1 wherein the pore forming agent is from about 0.5 wt % to about 10 wt % wherein the weight % is based on 100% of the inorganic ceramic-forming ingredients.

3. The method of claim 1 wherein the inorganic ceramic-forming ingredients comprises cordierite forming ingredients or aluminum-titanate forming ingredients.

4. The method of claim 1 wherein the green body is formed by extrusion.

5. The method of claim 1 further comprising the step of adding up to 80 wt % of a conventional pore forming material to the inorganic ceramic-forming materials wherein the weight % is based on 100% of the inorganic ceramic-forming ingredients.

6. The method of claim 5 wherein the conventional pore forming material is a starch, graphite or combinations thereof.

7. The method of claim 1 further comprising the step of drying the green body at a temperature below approximately 400° C. prior to firing the green body.

8. The method of claim 7 wherein the drying step accelerates an evolution of pore forming gas from the pore forming agent.

9. The method of claim 1 wherein the firing comprises heating the green body for a period of time sufficient to convert the green body into the ceramic article, wherein the ceramic article comprises a primary sintered phase composition.

10. The method of claim 9 wherein the green body is heated to a temperature in the range of from about 1300° C. to about 1450° C.

11. A method for manufacturing a porous ceramic honeycomb body comprising the steps of:

providing inorganic ceramic-forming ingredients;

adding an organic binder, a solvent and a pore forming agent to the inorganic ceramic-forming ingredients, wherein the pore forming agent is an organic peroxide of the general formula R—O—O—R' wherein R and R' are each independently alkyl, substituted alkyl, phenyl, napthyl, substituted phenyl, substituted napthyl groups or combinations thereof;

mixing the inorganic ceramic forming ingredients, the organic binder, the solvent and the pore forming agent to form a precursor batch;

extruding the precursor batch to form a honeycomb green body;

at least substantially drying the honeycomb green body at a temperature below approximately 400° C. prior to firing the green body; and firing the green body to produce a porous ceramic article.

12. The method of claim 11 wherein the pore forming agent is from about 5 wt % to about 10 wt % wherein the weight % is based on 100% of the inorganic ceramic-forming ingredients.

13. The method of claim 11 wherein the inorganic ceramic-forming ingredients comprises cordierite or aluminum titanate forming ingredients.

14. The method of claim 11 further comprising the step of adding up to 80 wt % of a conventional pore forming material to the inorganic ceramic-forming materials wherein the weight % is based on 100% of the inorganic ceramic-forming ingredients.

* * * * *